United States Patent
Park et al.

(10) Patent No.: US 8,897,170 B2
(45) Date of Patent: Nov. 25, 2014

(54) COMMUNICATION APPARATUS AND METHOD FOR MOBILE TERMINAL COMMUNICATION THROUGH A SENSOR NETWORK

(75) Inventors: Noseong Park, Daejeon (KR); Bong Wan Kim, Daejeon (KR); Sungsoo Kang, Daejeon (KR); Jae Gak Hwang, Daejeon (KR)

(73) Assignees: Electronics and Telecommunications Research Institute, Daejeon (KR); Dongaone Co., Ltd, Seoul (KR)

( * ) Notice: Subject to any disclaimer, the term of this patent is extended or adjusted under 35 U.S.C. 154(b) by 387 days.

(21) Appl. No.: 13/329,000

(22) Filed: Dec. 16, 2011

(65) Prior Publication Data

US 2012/0163295 A1 Jun. 28, 2012

(30) Foreign Application Priority Data

Dec. 23, 2010 (KR) ........................ 10-2010-0133664

(51) Int. Cl.
| | | |
|---|---|---|
| *H04W 84/18* | (2009.01) | |
| *H04W 48/20* | (2009.01) | |
| *H04W 52/02* | (2009.01) | |
| *H04W 40/28* | (2009.01) | |
| *H04W 28/06* | (2009.01) | |
| *H04W 28/08* | (2009.01) | |
| *H04W 88/16* | (2009.01) | |

(52) U.S. Cl.
CPC .............. *H04W 48/20* (2013.01); *H04W 40/28* (2013.01); *H04W 84/18* (2013.01); *H04W 28/06* (2013.01); *H04W 52/0219* (2013.01); *H04W 28/08* (2013.01); *H04W 88/16* (2013.01)
USPC ............................ 370/254; 370/328; 370/331

(58) Field of Classification Search
None
See application file for complete search history.

(56) References Cited

U.S. PATENT DOCUMENTS

| | | | |
|---|---|---|---|
| 8,085,792 B1 * | 12/2011 | Aly | 370/400 |
| 8,350,666 B2 * | 1/2013 | Kore | 340/5.2 |
| 8,514,760 B2 * | 8/2013 | Mukherjee | 370/311 |
| 8,625,575 B1 * | 1/2014 | Aly | 370/351 |
| 2010/0118727 A1 * | 5/2010 | Draves et al. | 370/252 |
| 2010/0118786 A1 * | 5/2010 | Ryu et al. | 370/328 |
| 2010/0128634 A1 * | 5/2010 | Rhee et al. | 370/254 |
| 2011/0317586 A1 * | 12/2011 | Palanki et al. | 370/254 |
| 2012/0063385 A1 * | 3/2012 | Yang et al. | 370/315 |

FOREIGN PATENT DOCUMENTS

WO    WO 2010133038 A1 * 11/2010 ............. H04W 4/12

OTHER PUBLICATIONS

Park et al; "A Communication Architecture for Supporting Mobile User in Wireless Sensor Networks"; IEEE, IEEE International Conference on Advanced Communication Technology; pp. 450-455.*
Park, Soochang et al., "A Communication Architecture for Supporting Mobile User in Wireless Sensor Networks," The 9th International Conference on Advance Communication Technology, pp. 450-455 (2007).

* cited by examiner

*Primary Examiner* — Robert C Scheibel
(74) *Attorney, Agent, or Firm* — Nelson Mullins Riley & Scarborough LLP

(57) ABSTRACT

A mobile terminal in a sensor network selects one of the sensors nodes in the sensor network as an upstream agent, and piggybacks a list of neighboring sensor nodes found in the upstream agent selection process on an upstream packet and transmits the upstream packet to a gateway through the upstream agent. The gateway in the sensor network selects one of the neighboring sensor nodes as a downstream agent using state information of the neighboring sensor nodes in the list, and transmits a downstream packet to the mobile terminal through the selected downstream agent.

18 Claims, 13 Drawing Sheets

FIG. 9

| PacketID | Up_Agent | Down_Agent | Dest |
|----------|----------|------------|------|
| 1 | aa | bb | Address of mobile terminal |

COMMUNICATION APPARATUS AND METHOD FOR MOBILE TERMINAL COMMUNICATION THROUGH A SENSOR NETWORK

CROSS-REFERENCE TO RELATED APPLICATION

This application claims priority to and the benefit of Korean Patent Application No. 10-2010-0133664 filed in the Korean Intellectual Property Office on Dec. 23, 2010, the entire contents of which are incorporated herein by reference.

BACKGROUND OF THE INVENTION (a) Field of the Invention

The present invention relates to a communication method and apparatus, and more particularly, to a communication apparatus and method, which allow a mobile terminal to communicate with a server or gateway through a sensor network.

(b) Description of the Related Art

A sensor network consists of low power sensor nodes. A mobile terminal (mobile device) is used to receive various information stored in a server through the sensor network and displays it, or to allow a user to send specific information to the server.

Such a mobile terminal selects one of the sensor nodes of the sensor network as an agent to communicate with an upper server or gateway. That is, the mobile terminal transmits particular data to the upper server or gateway via the sensor node corresponding to the agent, and the gateway writes the sensor node corresponding to the agent of the mobile terminal and transmits all data transmitted from the upper server to the corresponding mobile terminal via the sensor node corresponding to the agent of the mobile terminal. The mobile terminal communicates with the upper server or gateway only via the selected agent until the next agent selection time. However, it is impossible to make sure whether the selected agent can provide an optimal path until the next agent selection time. Moreover, the selected agent may not be able to provide an optimum path for both of upstream data and downstream data. That is, even though the mobile terminal is moved and rendered incapable of communicating with the selected agent, it continues to attempt communication with the agent that has become uncommunicable until the next agent selection period. At this point, packets may be damaged.

In addition, the sensor nodes of the sensor network perform an operation for reducing energy consumption by using asynchronous low power MAC (Medium Access Control). Much energy may be consumed at the sensor nodes due to signaling for the selection of an agent between the mobile terminal and the sensor nodes, and this may cause a communication failure between the mobile terminal and the upper server.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a communication apparatus and method, which are for sending and receiving an upstream packet and a downstream packet through an optimal routing path.

An exemplary embodiment of the present invention provides a communication method for a mobile terminal in a sensor network. The communication method for the mobile terminal includes: selecting an upstream agent to transmit an upstream packet from a plurality of sensor nodes of the sensor network; piggybacking information of the neighboring sensor nodes on the upstream packet and transmitting the upstream packet to the upstream agent; and receiving a downstream packet responsive to the upstream packet through a downstream agent selected by a gateway that has received the upstream packet through the upstream agent.

Another exemplary embodiment of the present invention provides a communication method for a gateway in a sensor network. The communication method for the gateway includes: receiving an upstream packet of a mobile terminal through an upstream agent; registering the upstream agent, a downstream agent, and the address of the mobile terminal corresponding to the sequence number of the upstream packet in a management table; receiving a downstream packet responsive to the upstream packet from an upper server; and transmitting the downstream packet to the mobile terminal through the downstream agent corresponding to the sequence number of the upstream packet.

Another exemplary embodiment of the present invention provides a communication apparatus for a mobile terminal in a sensor network. The communication apparatus for the mobile terminal includes a transmitter, a receiver, and an agent selector. The transmitter continuously broadcasts a first message specifying request information to a plurality of sensor nodes of the sensor network at predetermined time intervals. The receiver receives a second message responsive to the first message from at least one of the sensor nodes that has received the first message during respective time periods. The agent selector selects an upstream agent and a downstream agent based on a reply value corresponding to the request information contained in the second message received during a predetermined period.

Another exemplary embodiment of the present invention provides a communication apparatus for a gateway in a sensor network. The communication apparatus for the gateway includes a management table, a receiver, an agent selector, an information manager, and a transmitter. The receiver receives an upstream packet of a mobile terminal from an upstream agent selected by the mobile terminal. The agent selector selects a downstream agent using a list of neighboring sensor nodes delivered as a piggyback on the upstream packet of the mobile terminal and state information of the neighboring sensor nodes in the list. The information manager registers the upstream agent, the downstream agent, and the address of the mobile terminal corresponding to the sequence number of the upstream packet in the management table. The transmitter transmits a downstream packet responsive to the upstream packet to the mobile terminal through the downstream agent.

BRIEF DESCRIPTION OF THE DRAWINGS

FIG. 9 is a view showing one example of a management table of a gateway according to an exemplary embodiment of the present invention.

DETAILED DESCRIPTION OF THE EMBODIMENTS

Figure 1:
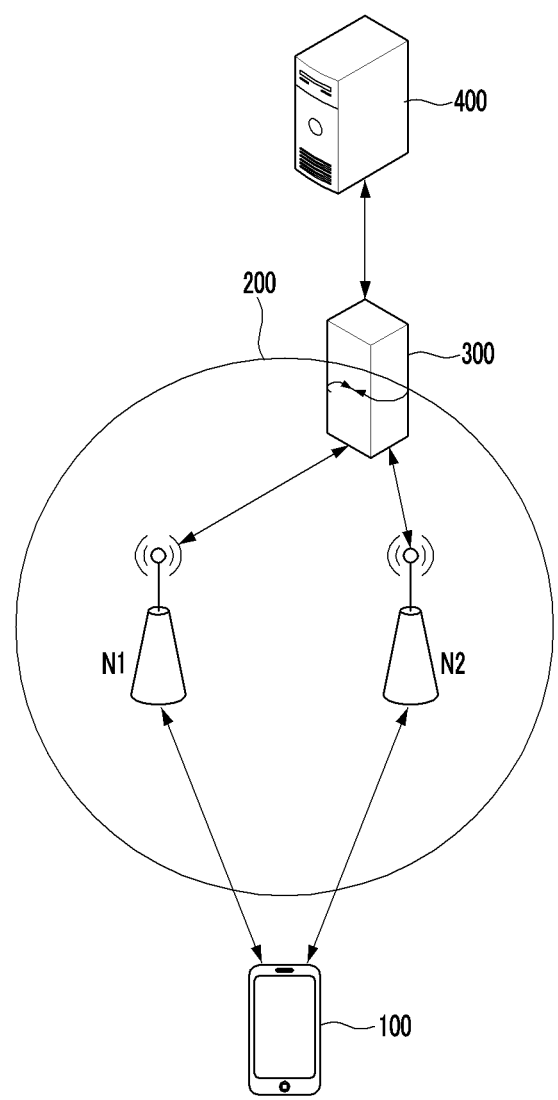
FIG. 1 is a view schematically showing a communication method for a mobile terminal in a sensor network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Now, a communication apparatus and method according to an exemplary embodiment of the present invention will be described in detail with reference to the drawings.

FIG. 1 is a view schematically showing a communication method for a mobile terminal in a sensor network according to an exemplary embodiment of the present invention.

Referring to FIG. 1, a mobile terminal 100 in a sensor network 200 selects an upstream agent and a downstream agent from among sensor nodes N1 and N2 of the sensor network 200 to communicate with a gateway 300 and a server 400. The upstream agent is one of the sensor nodes N1 and N2 of the sensor network 200, which transmits an upstream packet of the mobile terminal 100 to the gateway 300. The downstream agent is one of the sensor nodes N1 and N2 of the sensor network 200, which transmits a downstream packet of the server 400 or gateway 300 to the mobile terminal 100. For example, if the sensor node N1 is selected as the upstream agent, the mobile terminal 100 can transmit an upstream packet to the sensor node N1.

The sensor network 200 includes the sensor node N1 and N2. Although FIG. 1 illustrates two sensor nodes N1 and N2 for convenience of description, the sensor network 200 may include more than two sensor nodes.

The sensor node N1 and N2 senses recognition information of objects as well as environmental information such as temperature, light, acceleration, etc. to collect these information, and transmits the collected information to the server 400 through communication between the sensor nodes. At this point, to reduce power consumption of the batteries or the like of the sensor nodes N1 and N2, asynchronous low power MAC (Medium Access Control) uses a wake-up scheme.

That is, the sensor nodes N1 and N2 reduce power consumption using the asynchronous low power MAC-based wake-up scheme. The asynchronous low power MAC-based wake-up scheme will be described later with reference to FIG. 2.

Next, the mobile terminal 100 receives various information stored in the server 400 through the sensor network 200 and displays it, or transmits information received from a user to the server 400 through the sensor network 200.

The gateway 300 serves to send and receive information between the sensor nodes N1 and N2 and the server 400. The gateway 300 manages routing information including information of the upstream agent and downstream agent of the mobile terminal 100, and processes an upstream packet of the mobile terminal 100 and a downstream packet of the mobile terminal 100 using the routing information.

Moreover, the gateway 300 may serve to select the downstream agent of the mobile terminal 100. If the sensor node N2 is selected as the downstream agent for a downstream packet to be transmitted to the mobile terminal 100, the gateway 300 transmits the downstream packet to the sensor node N2 and requests the sensor node N2 to transmit the downstream packet to the mobile terminal 100.

Figure 2:
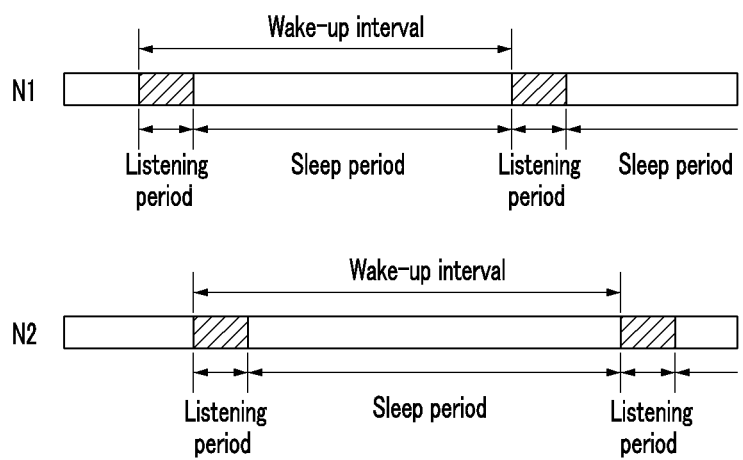
FIG. 2 is a view showing an asynchronous low power MAC-based wake-up scheme.

FIG. 2 is a view showing an asynchronous low power MAC-based wake-up scheme.

Referring to FIG. 2, the sensor nodes N1 and N2 wake up at every wake-up interval and switch to a listening mode to listen to a radio frequency (RF) channel for a while during a listening period, and then switch to a sleep mode to go to sleep again during a sleep period.

That is, the wake-up interval includes the listening period during which the sensor nodes N1 and N2 listen to the RF channel and the sleep period during which the sensor nodes N1 and N2 sleep. For instance, the sensor nodes N1 and N2 can repeat the process of waking up every second, listening to the RF channel for 10 ms, and then going to sleep.

In this manner, the sensor nodes N1 and N2 using the asynchronous low power MAC-based wake-up scheme are able to reduce power consumption because they stay asleep for most of the time. As such, the sensor nodes N1 and N2 being asleep for most of the time are capable of performing communication in the method shown in FIG. 3.

Figure 3:
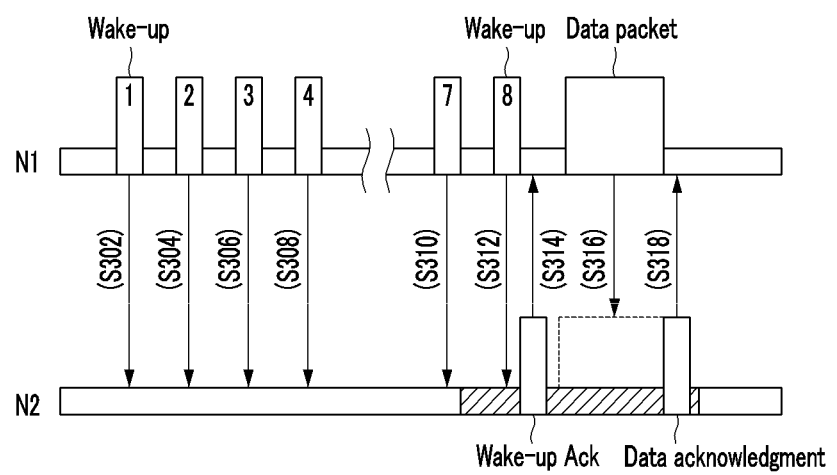
FIG. 3 is a view for explaining a communication method for a sensor node using the asynchronous low power MAC-based wake-up scheme.

FIG. 3 is a view for explaining a communication method for a sensor node using the asynchronous low power MAC-based wake-up scheme.

Referring to FIG. 3, the sensor node N1 continuously transmits a wake-up message until the sensor node N2 wakes up and listens to the RF channel in the listening period (S302-S312).

The sensor node N2 wakes up and hears the wake-up message in the listening period, and transmits a wake-up ack message to the sensor node N1 (S314). Having received the wake-up message, the sensor node N2 does not switch to the sleep mode but waits to receive a data packet.

Having received the wake-up ack message from the sensor node N2, the sensor node N1 detects that the sensor node N2 has woken up, and transmits a data packet to the sensor node N2 (S316).

Having received the data packet, the sensor node N2 transmits a data ack message to the sensor node N1 to notify the sensor node N1 of the successful reception of the data packet (S318).

In this way, upon completion of the transmission and reception of the data packet, the sensor nodes N1 and N2 enter the sleep mode again to reduce battery consumption.

Figure 4:
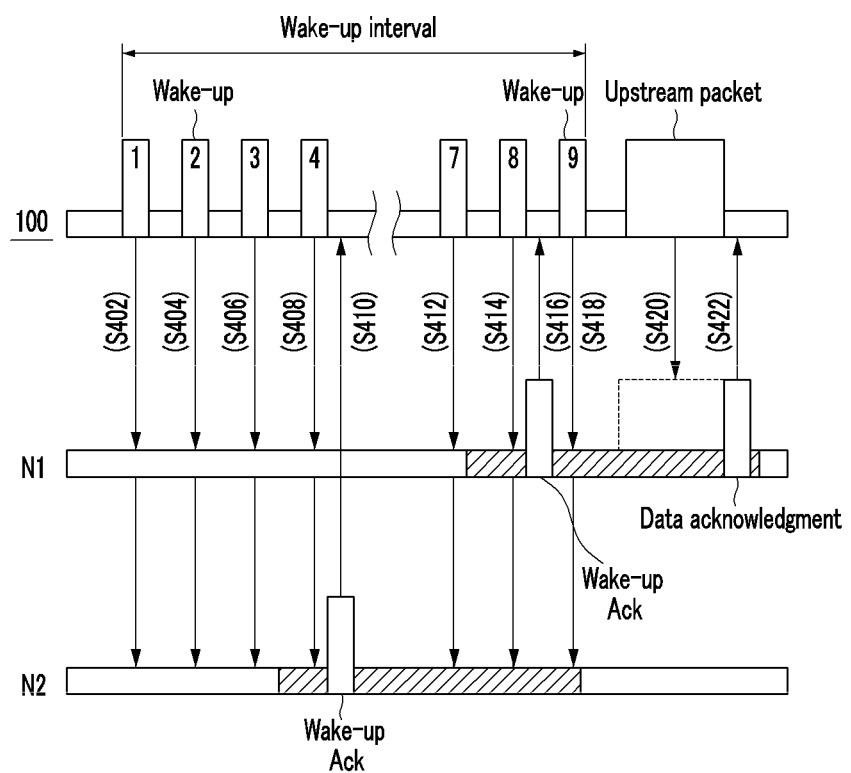
FIGS. 4 to 6 are views showing a method for a mobile terminal to select an upstream agent according to first to third exemplary embodiments of the present invention.

FIG. 4 is a view showing a method for a mobile terminal to select an upstream agent according to a first exemplary embodiment of the present invention.

Referring to FIG. 4, if communication with the sensor network 200 is needed, the mobile terminal 100 continuously broadcasts an agent request (AREQ) message (S402-S408, S412-S414, S418). The AREQ message includes a Criteria Type (CT) field and a Current Best Value (CBV) field. The CT field specifies a criteria parameter that the mobile terminal 100 uses to select an upstream agent. For example, remaining battery amount, transmission success rate, etc. can be used as the criteria parameter that the mobile terminal 100 uses to select the upstream agent. The CT field is a field used to specify the criteria parameter. The CBV is a field for specifying the best value of information requested in the CT field, which will be described later in further details.

When the neighboring sensor nodes N1 and N2 wake up and receive an AREQ message in the listening period (S408 and S414), they transmit an Agent Reply (AREP) message to the mobile terminal 100 (S410 and S416). The AREP message contains the information requested in the CT field. For example, if the CT is remaining battery amount, the sensor nodes N1 and N2 each includes remaining battery amount information in the AREP message and transmits the AREP message to the mobile terminal 100. Upon receiving the AREP message from the sensor nodes N1 and N2, the mobile terminal 100 broadcasts an AREQ message that contains the best value of the information included in the AREP message in the CBV field.

The mobile terminal 100 selects the sensor node having the best CBV value as the upstream agent while repeating the transmission of the AREQ message and the reception of the AREP message during a wake-up interval.

During one wake-up interval, the mobile terminal 100 transmits an upstream data packet to be transmitted after one wake-up interval through the agent selected during the wake-up interval (S420).

Having received the data packet, the sensor node N1 transmits a data ack message to the mobile terminal 100 to notify the mobile terminal 100 of the successful reception of the data packet (S422).

Moreover, the mobile terminal 100 can select the upstream agent for each data packet transmission, and transmit a data packet to the selected agent.

For example, as shown in FIG. 4, the mobile terminal 100 is able to continuously broadcast 1st to 9th AREQ messages at predetermined intervals during one wake-up interval (S402-S408, S412-S414, S418). At this point, the CBV of an AREQ message may have a null value before the mobile terminal 100 receives the first AREP message, i.e., an AREP message responsive to the 4th AREQ message, from at least one of the sensor nodes N1 and N2.

Then, the sensor node N2 that has heard the 4th AREQ message broadcast by the mobile terminal 100 transmits an AREP message containing requested information to the mobile terminal 100 (S410). The mobile terminal 100 includes the value transmitted by the sensor node N2 in the CBV field of a corresponding AREQ message and broadcasts the AREQ message, starting from the fifth AREQ message. Although FIG. 4 illustrates that an AREP message is received from one sensor node N2 that has heard the 4th AREQ message for the convenience of explanation, an AREP message containing information requested by multiple sensor nodes that have heard the 4th AREQ message may be transmitted to the mobile terminal 100, and the mobile terminal 100 may select the best value of this information and include it in the CBV field of the fifth AREQ message.

Moreover, when the sensor node N1 has received the 8th AREQ message broadcast by the mobile terminal 100 in the listening period, the sensor node N1 compares its own value with the value contained in the AREQ message. If the value of the CBV field is worse than its own value, the sensor node N1 may transmit an AREP message containing its own value to the mobile terminal 100. On the other hand, if the value of the CBV field is better than its own value, the sensor node N1 may switch to the sleep mode again without transmitting an AREP message.

Having received the AREP message from the sensor node N1, the mobile terminal 100 changes the value of the CBV field of a corresponding AREQ message to the value transmitted from the sensor node N1 and broadcasts the AREQ message, starting from the 9th AREQ message, because the value transmitted from the sensor node N1 is better. At this time, the sensor node N2 receives the 9th AREQ message (S418), and checks if the value of the CBV field of the 9th AREQ message is different from its own value. If so, the sensor node N2 detects that there exists a sensor node having a better value, and immediately switches to the sleep mode. On the contrary, the node N1 detects itself as being selected as the upstream agent, and operates in the listening mode until actual data is sent from the mobile terminal 100.

By broadcasting AREQ messages and receiving AREP messages during one wake-up interval, the mobile terminal 100 selects the sensor node N1 as the upstream agent, and transmits an upstream packet to the sensor node N1 after the wake-up interval (S420), and the sensor node N1 having received the upstream packet transmits a data acknowledgment to the mobile terminal 100.

In the process for the mobile terminal 100 to select the upstream agent by the mobile terminal 100, the step for the mobile terminal 100 to continuously broadcast an AREQ message is a step similar to the aforementioned step of continuously broadcasting a wake-up message Thus, the mobile terminal 100 according to the exemplary embodiment of the present invention can replace an AREQ message with a wake-up message. The mobile terminal 100 may add the CT field and the CBV field to the wake-up message and broadcast the wake-up message to the neighboring sensor nodes N1 and N2. In this case, the wake-up message serves to wake up the neighboring sensor nodes N1 and N2 and also serves to request information required for the selection of the upstream agent.

Moreover, the neighboring sensor nodes N1 and N2 may replace an AREP message with a wake-up reply message. The neighboring sensor nodes N1 and N2 check the CBV field of the wake-up message for information requested by the mobile terminal 100. Afterwards, the sensor nodes N1 and N2 may send a wake-up reply message containing the information requested by the mobile terminal 100 to the mobile terminal 100.

By replacing an AREQ message with a wake-up message in this way, there is no need to use a separate message for the selection of an agent, thereby reducing the load of the agent selection process.

In addition, the mobile terminal 100 according to the exemplary embodiment of the present invention is able to select the downstream agent simultaneously with the selection of the upstream agent in the same way as the upstream agent selection method. A criteria parameter for the selection of the upstream agent and a criteria parameter for the selection of the downstream agent may be equal to or different from each other. When the mobile terminal 100 selects the downstream agent in this manner, the mobile terminal 100 notifies the gateway 300 of the downstream agent by transmitting information of the downstream agent, as a piggyback on an upstream packet, to the gateway 300 through the upstream agent.

That is, since one agent does not provide an optimal path for upstream and downstream packets, an optimal routing path for upstream and downstream packets can be provided by selecting the upstream agent and the downstream agent, respectively, as shown in the exemplary embodiment of the present invention.

Figure 5:
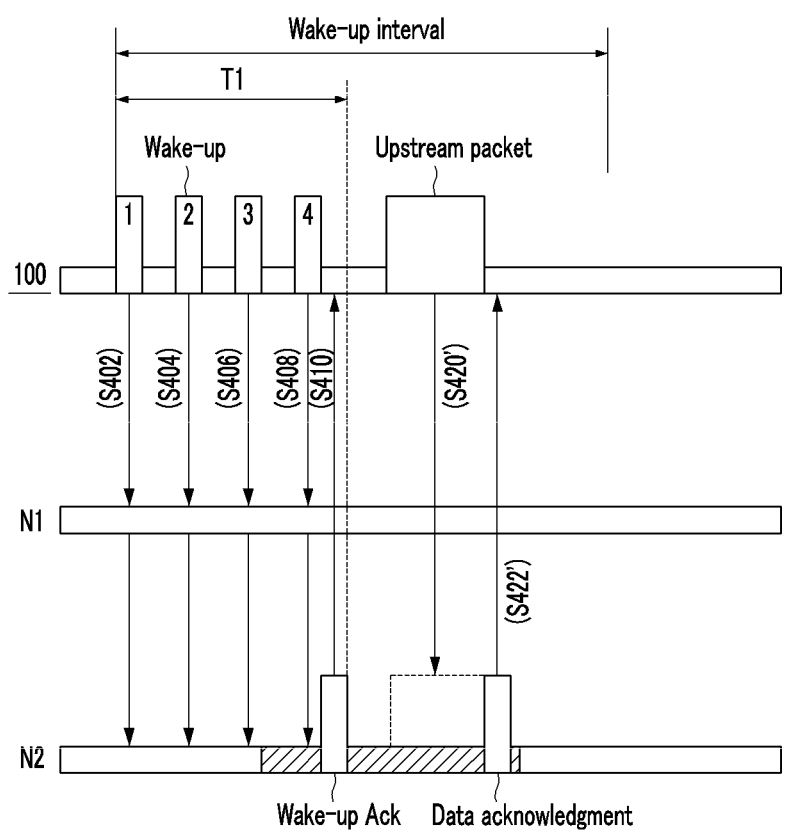

FIG. 5 is a view showing a method for a mobile terminal to select an upstream agent according to a second exemplary embodiment of the present invention.

Referring to FIG. 5, the mobile terminal 100 can broadcast an AREQ message not during one wake-up interval but only until the instant T1 when an appropriate upstream agent is found (S402-S408). In the case of selecting a downstream agent as well, the mobile terminal 100 can broadcast an AREQ message until the instant both an appropriate upstream agent and an appropriate downstream agent are found.

For example, upon receiving an AREP message from the sensor node N2 that has heard the 4th AREQ message broadcast by the mobile terminal 100 itself (S410), the mobile terminal 100 checks the value of the CBV field of the AREP message. Afterwards, if the value of the CBV field is determined as appropriate for the selection of the upstream agent, the mobile terminal 100 selects the sensor node N2 as the upstream agent.

Then, the mobile terminal 100 stops the transmission of AREQ message and transmits an upstream packet to the sensor node N2 (S420'), and the sensor node N2 having received the upstream packet transmits a data acknowledgment to the mobile terminal (S422').

Although, like the first exemplary embodiment of the present invention, the mobile terminal 100 may broadcast an AREQ message during one wake-up interval, and receive an AREP message and select the upstream agent, this may increase the RF channel occupation time in the agent selection process and interrupt communication with other sensor nodes.

If, on the other hand, an AREQ message is broadcast only until the instant T1 when an appropriate upstream agent is found as in the second exemplary embodiment of the present invention, the RF channel occupation time can be reduced compared to the first exemplary embodiment.

One wake-up interval may be usually 500 ms to 1 sec, and the time T1 required until an appropriate agent is found, although arbitrary, may be shorter than one wake-up interval. Thus, if an AREQ message occupies an RF channel for a long time, a reduction in data throughput can be prevented.

Further, the mobile terminal 100 is able to adjust the AREQ message broadcast time depending on the traffic volume of the neighboring sensor nodes N1 and N2. That is, if the traffic volume of the neighboring sensor nodes N1 and N2 is not large, the mobile terminal 100 may broadcast an AREQ message during one wake-up interval, and, otherwise, if the traffic volume of the neighboring sensor nodes N1 and N2 is large, the neighboring sensor nodes N1 and N2 may broadcast an AREQ message only until an appropriate agent is found.

Figure 6:
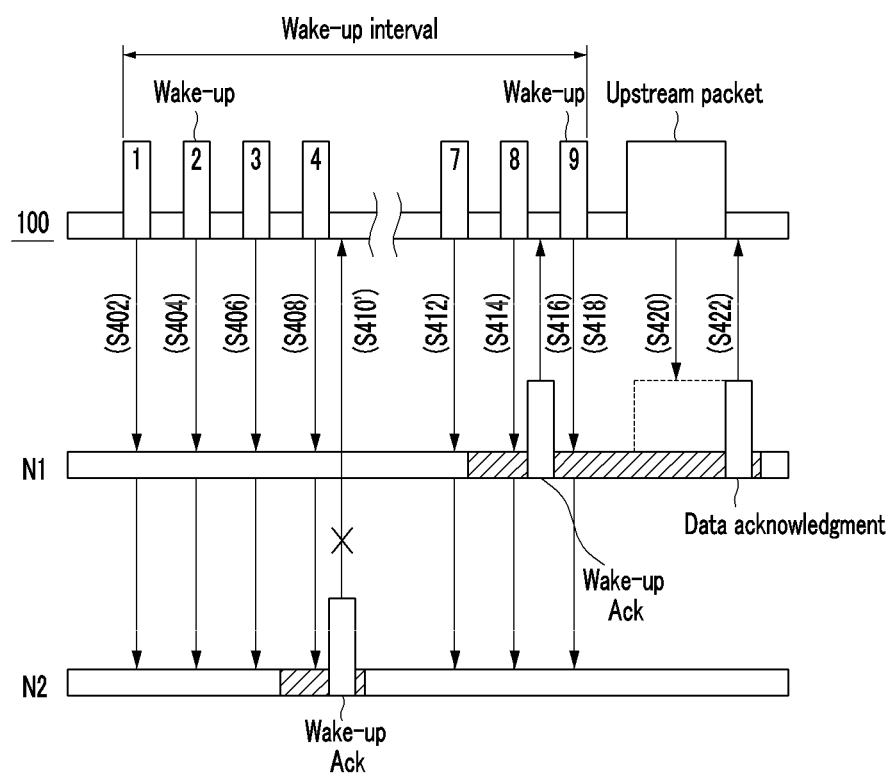

FIG. 6 is a view showing a method for a mobile terminal to select an upstream agent according to a third exemplary embodiment of the present invention.

Referring to FIG. 6, the sensor nodes N1 and N2 may hear an AREQ message in a listening period and ignore it.

For example, unlike the first exemplary embodiment, although the sensor node N2 has received the 4th AREQ message broadcast by the mobile terminal 100 in the listening period, the sensor node N2 may not transmit an AREP message to the mobile terminal 100 if it does not want to be an agent itself even when the value of CBV of the AREQ message is worse than its own value, or if many packets are stored in a queue, or if the remaining battery amount is not enough (S410'). In this case, the sensor node N2 switches to the sleep mode again to reduce power consumption.

According to the exemplary embodiment of the present invention, the mobile terminal 100 may select the downstream agent simultaneously with the selection of an upstream agent depending on the upstream agent selection methods according to the first to third exemplary embodiments of the present invention. If the mobile terminal 100 has selected a downstream agent, information of the downstream agent may be piggybacked on an upstream packet to be transmitted to the gateway 300 to notify the gateway 300 of the information.

Otherwise, the gateway 300 may select the downstream agent.

Figure 7:
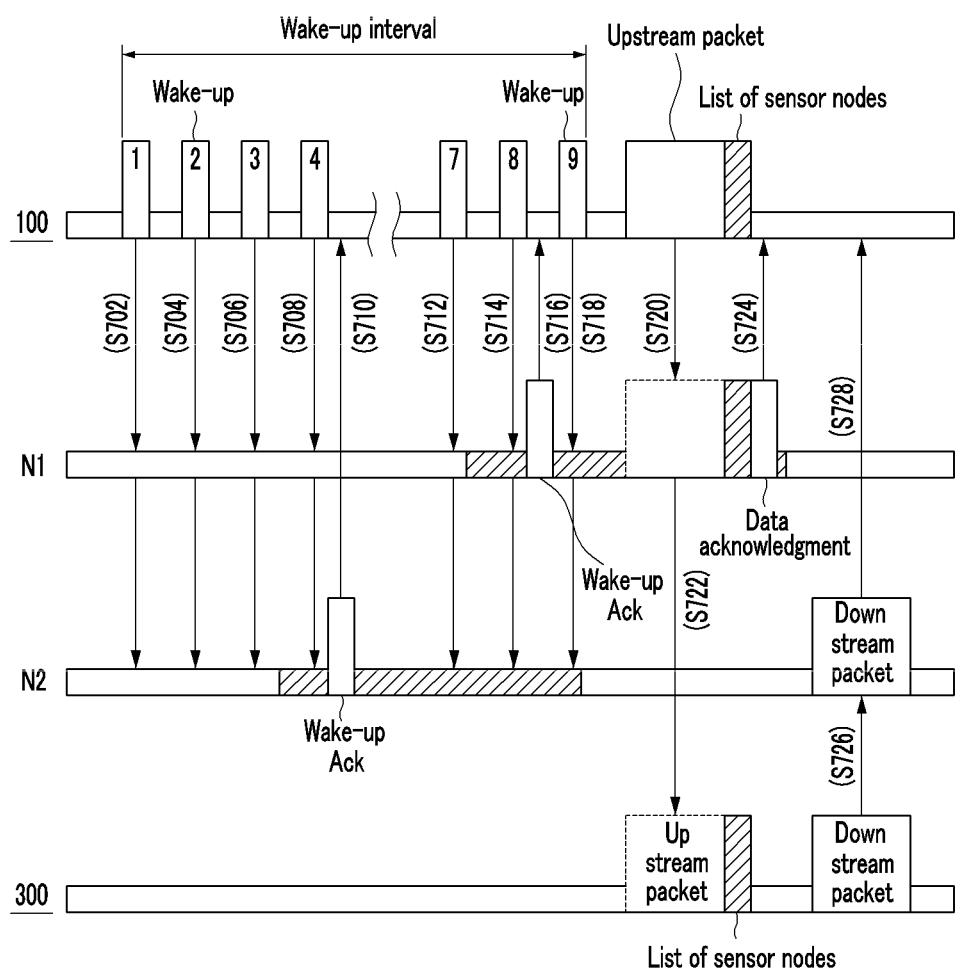
FIG. 7 is a view showing a method for a gateway to select a downstream agent according to an exemplary embodiment of the present invention.

FIG. 7 is a view showing a method for a gateway to select a downstream agent in a gateway according to an exemplary embodiment of the present invention.

Referring to FIG. 7, the mobile terminal 100 selects an upstream agent in one of the methods according to the first to the third exemplary embodiments (S702-S718), and then piggybacks a list of sensor nodes found during the upstream agent selection process on an upstream packet and transmits the upstream packet to the gateway 300 through the sensor node N1 serving as the upstream agent (S720-S722). The sensor node N1 transmits a data acknowledgment for the upstream packet to the mobile terminal 100 (S724).

FIG. 7 illustrates that the upstream agent is selected in the method according to the first exemplary embodiment. Moreover, although FIG. 7 illustrates only the sensor nodes N1 and N2 as the sensor nodes found during the upstream agent selection process for the convenience of explanation, it is actually possible that multiple sensor nodes are found during the upstream agent selection process, and one of the sensor nodes becomes a downstream agent.

The gateway 300 having received an upstream packet selects one of a list of sensor nodes piggybacked on the upstream packet as the downstream agent for the mobile terminal 100, and forwards a downstream packet streaming down from the server 400 to the selected downstream agent and requests the downstream agent to pass the downstream packet to the mobile terminal 100 (S726).

For example, when the sensor node N2 is selected as the downstream agent, the gateway 300 forwards a downstream packet to the sensor node N2 and requests the sensor node N2 to pass the downstream packet to the mobile terminal 100 (S726). Then, the sensor node N2 transmits the downstream packet to the mobile terminal 100 (S728).

In general, the gateway 300 monitors the state of all sensor nodes in the sensor network 200 for the purpose of network management. Monitoring targets may include current remaining battery amount, transmission success rate, end-to-end delay, etc. The transmission success rate refers to the ratio of packets successfully received by the gateway to packets sent from the corresponding sensor node N1, which may represent the reliability of a routing path. The end-to-end delay refers to the time taken for the packets sent from the corresponding sensor node N1 to reach the gateway 300. Moreover, the gateway 300 is aware of the routing paths of all the sensor nodes of the sensor network 200. Accordingly, the gateway 300 can select the downstream agent better than the mobile terminal 100 can because the gateway 300 itself has more information than that used to select the downstream agent.

In further explanation, the transmission success rate and end-to-end delay monitored by the gateway 300 are all associated with upstream packets. That is, the gateway 300 measures and manages the transmission success rate and end-to-end delay of packets transmitted from the sensor nodes to the gateway 300. However, the gateway 300 is not aware of the transmission success rate of downstream packets and the end-to-end delay of downstream packets. The transmission success rate of downstream packets refers to the ratio of packets successfully received by the corresponding sensor node N1 to packets sent from the gateway 300, and the end-to-end delay of downstream packets refers to the time taken for the packets sent from the gateway 300 to reach the corresponding sensor node N1.

The downstream agent is a node that forwards a downstream packet to the mobile terminal 100 with a transmission success rate and end-to-end delay optimized for the downstream packet. Therefore, the gateway 300 is able to select a sensor node, which is estimated as optimal, as the downstream agent of the mobile terminal 100 by using a network tomography technique for estimating the performance index of a downstream packet using the performance index of an upstream packet.

Figure 10:
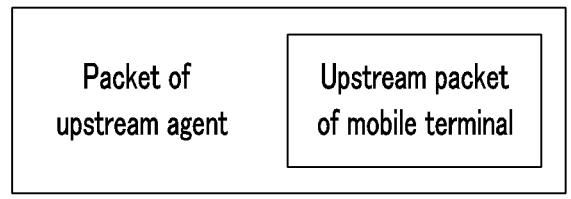
FIG. 10 is a view showing one example of encapsulation.

Next, a method for the gateway 300 to support communication between the mobile terminal 100 and the server 400 will be described with reference to FIGS. 8 to 10.

Figure 8:
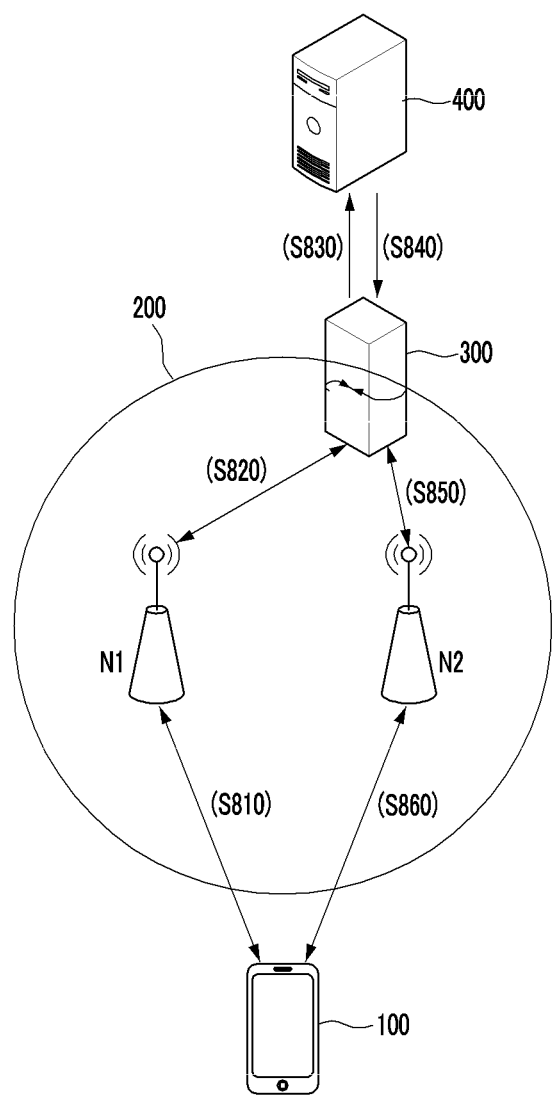
FIG. 8 is a view schematically showing a method for a gateway to support communication between a mobile terminal and a server according to an exemplary embodiment of the present invention.

FIG. 8 is a view schematically showing a method for a gateway to support communication between a mobile terminal and a server according to an exemplary embodiment of the present invention. FIG. 9 is a view showing one example of a management table of a gateway according to an exemplary embodiment of the present invention. FIG. 10 is a view showing one example of encapsulation.

Referring to FIG. 8, the gateway 300 manages routing information of a management table in order to support communication between the mobile terminal 100 and the server 400.

As shown in FIG. 9, the routing information of the management table includes a packet identifier (PacketID), an upstream agent (Up_Agent), a downstream agent (Down_Agent), and destination information (Dest). The packet identifier (PacketID) indicates the sequence number of an upstream packet sent from the mobile terminal 100, and the destination information (Dest) indicates the address of the mobile terminal 100. As one mobile terminal 100 exists in FIG. 8, the destination information is the address of the mobile terminal 100. For example, if the mobile terminal 100 has piggybacked information of the sensor node N2 serving as the downstream agent on a first upstream packet and has transmitted the first upstream packet to the gateway 300 through the upstream agent N1, the gateway 300 may write "1", "aa", "bb", and "address of mobile terminal", respectively, in the packet identifier (PacketID), the upstream agent (Up_Agent), the downstream agent (Down_Agent), and the destination information (Dest) of the management table. Here, "aa" and "bb" indicate the identifiers of the sensor node N1 and the sensor node N2, respectively.

The transmission of an upstream packet from the mobile terminal 100 in the sensor network 200 involves sending a query to the server 400. For example, the mobile terminal 100 transmits, to the upstream agent, a query requesting the average value of ambient temperature for a day reported by a particular sensor node (S810).

Upon receiving a query, i.e., an upstream packet, from the mobile terminal 100, the upstream agent encapsulates the query as if the query was its own packet and transmits it to the gateway 300 (S820). That is, as shown in FIG. 10, the upstream agent generates a new packet with a payload of the upstream packet of the mobile terminal 100 and transmits it to the gateway 300.

The gateway 300 de-encapsulates the encapsulated packet received from the upstream agent to restore the upstream packet sent from the mobile terminal 100. Moreover, the gateway 300 identifies the sensor node N1 as the upstream agent of the upstream packet with sequence number 1 sent from the mobile terminal 100, and registers the corresponding information in the management table (S820). For example, the gateway 300 can identify the sensor node N1 as the upstream agent upon receiving a query with sequence number 1 from the sensor node N1, and register it in the management table as shown in FIG. 9. Here, the downstream agent is assumed to be the sensor node N2. At this point, information of the downstream agent may be piggybacked on the query, or may be selected by the gateway 300.

Thereafter, the gateway 300 transmits the upstream packet to the server 400 (S830).

Upon receiving a reply to the query, i.e., a downstream packet, from the server 400 (S840), the gateway 300 identifies the downstream agent to transmit the reply in the management table, and then transmits the reply to the downstream agent (S850). For example, if the downstream packet is a reply to the first upstream packet, the gateway 300 can select the sensor node N2 with the identifier "bb" as the downstream agent by referring to the management table of FIG. 9.

Next, the downstream agent transmits the reply of the server 400 received from the gateway 300 to the mobile terminal 100 (S860).

Next, a method for the gateway 300 to efficiently update a downstream agent will be described with reference to FIG. 11.

Figure 11:
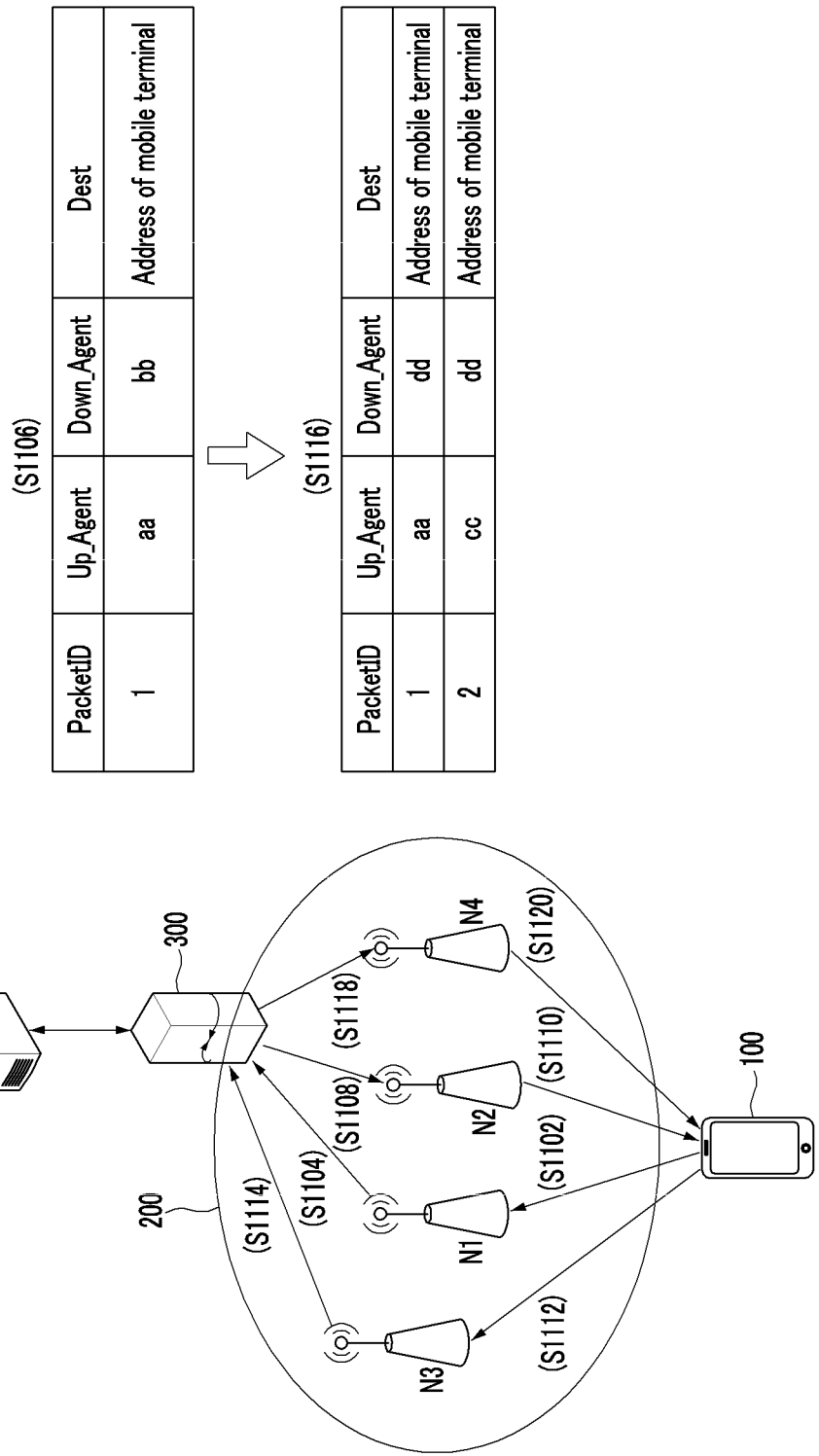
FIG. 11 is a view showing a method for a gateway to update a downstream agent according to an exemplary embodiment of the present invention.

FIG. 11 is a method for a gateway to update a downstream agent according to an exemplary embodiment of the present invention.

FIG. 11 illustrates four sensor nodes for convenience of explanation. Also, FIG. 11 assumes that the sensor node N1 and the sensor node N2 are respectively selected as the upstream agent and downstream agent for an upstream packet with sequence number 1, and the sensor node N3 and the sensor node N4 are selected as the upstream agent and downstream agent for an upstream packet with sequence number 2.

Referring to FIG. 11, if the sensor node N1 is selected as the upstream agent for the upstream packet with sequence number 1, the mobile terminal 100 transmits the upstream packet to the sensor node N1 (S1102). At this point, the mobile terminal 100 piggybacks a list of sensor nodes found during the upstream agent selection process on the upstream packet, and transmits the upstream packet to the sensor node N1.

The sensor node N1 transmits the upstream packet to the gateway 300 (S1104).

The gateway 300 confirms that the sensor node N1 is the upstream agent based on the upstream packet with sequence number 1 of the mobile terminal 100 received from the sensor node N1, and registers "1", "aa", and "address of mobile terminal", respectively, in the packet identifier (PacketID), the upstream agent (Up_Agent), the downstream agent (Down_Agent), and the destination information (Dest) of the management table. Moreover, the gateway 300 checks the list of sensor nodes from the upstream packet, and selects one of the list of sensor nodes, i.e., the sensor node N2, as the downstream agent and registers "bb" in the downstream agent (Down_Agent) of the management table (S1106).

Thereafter, the gateway 300 transmits an upstream packet with sequence number 1 to the server 400.

Also, upon receiving a downstream packet responsive to the upstream packet with sequence number 1 from the server 400, the gateway 300 identifies the downstream agent corresponding to sequence number 1 in the management table and transmits the downstream packet to the sensor node N2 with the identifier "bb" (S1108). The sensor node N2 can transmit the received downstream packet to the mobile terminal 100 (S1110).

Afterwards, when an upstream packet to be transmitted is generated, the mobile terminal 100 selects an upstream agent again. If the sensor node N3 is selected as the upstream agent, the mobile terminal 100 piggybacks a list of sensor nodes found during the upstream agent selection process on the upstream packet with sequence number 2, and transmits it to the gateway 300 through the sensor node N3 (S1112-S1114).

The gateway 300 confirms that the sensor node N3 is the upstream agent based on the upstream packet with sequence number 2 of the mobile terminal 100 received from the sensor node N3, and registers "2", "cc", and "address of mobile terminal", respectively, in the packet identifier (PacketID), the upstream agent (Up_Agent), and the destination information (Dest) of the management table. Moreover, the gateway 300 checks the list of sensor nodes from the upstream packet, and selects one of the list of sensor nodes, i.e., the sensor node N4, as the downstream agent and registers "dd" in the downstream agent (Down_Agent) of the management table (S1116). Here, "cc" and "dd" indicate the identifiers of the sensor node N3 and the sensor node N4, respectively. At this point, the gateway 300 can change the downstream agents of all packets to the sensor node N4 in the management table. This is because the sensor node N4 is the downstream agent selected based on the information of sensor nodes sent from the gateway 300, piggybacked on the latest upstream packet, thus providing the highest reliability. For example, if the mobile terminal 100 has moved far away and sent the upstream packet with sequence number 2, the mobile terminal 100 may not be able to communicate with the sensor node N2 serving as the downstream agent for the 1st upstream packet. If the mobile terminal 100 is unable to communicate with the sensor node N2 serving as the downstream agent for the 1st upstream packet, when a downstream packet responsive to the 1st upstream packet is received from the server 400 and forwarded to the sensor node N2, the mobile terminal 100 cannot receive the downstream packet. Accordingly, the gateway 300 updates the management table with the latest downstream agent information with respect to all packets (S1116).

Afterwards, upon receiving a downstream packet responsive to the upstream packet with sequence number 2 from the server 400, the gateway 300 identifies the downstream agent with the latest sequence number in the management table and transmits the downstream packet to the sensor node N4 with the identifier "dd" (S1118). The sensor node N4 can transmit the received downstream packet to the mobile terminal 100 (S1120).

In addition, as explained above, after the update of the management table (S116), upon receiving a downstream packet responsive to the upstream packet with sequence number 2 from the server 400, the gateway 300 can identify the downstream agent with the latest sequence number in the management table and transmit the downstream packet to the sensor node N4 with the identifier "dd".

Next, a communication apparatus for the mobile terminal 100 and the gateway 300 that performs the operations explained in FIGS. 3 to 11 will be described in details with reference to FIGS. 12 and 13.

Figure 12:
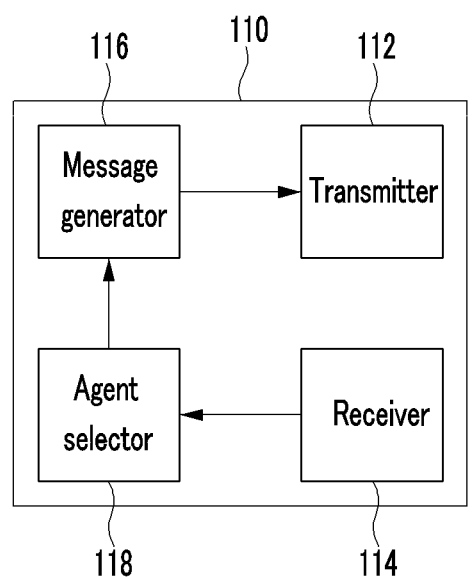
FIG. 12 is a view showing a communication apparatus for a mobile terminal according to an exemplary embodiment of the present invention.

FIG. 12 is a view showing a communication apparatus for a mobile terminal according to an exemplary embodiment of the present invention.

Referring to FIG. 12, a communication apparatus 110 of a mobile terminal comprises a transmitter 112, a receiver 114, a message generator 116, and an agent selector 118.

The transmitter 112 broadcasts an AREQ message. Moreover, the transmitter 112 transmits an upstream packet.

The receiver 114 receives an AREP message and forwards it to the agent selector 118. Moreover, the receiver 114 can receive a downstream packet and forward it to an upper layer (not shown).

The message generator 116 receives a criteria parameter(s) for the selection of an upstream agent and/or a downstream agent from the agent selector 118, and specifies the selection criteria parameter(s) in the CT field of the AREQ message and forwards the AREQ message to the transmitter 112. Moreover, upon receiving a value of the CVB field from the agent selector 118, the message generator 116 additionally specifies the value in the CBV field of the AREQ message and forwards the AREQ message to the transmitter 112.

The agent selector 118 stores the criteria parameters for the selection of an upstream agent and a downstream agent, and forwards them to the message generator 116. Moreover, the agent selector 118 checks the values of the CVB fields of the AREP messages of the respective sensor nodes forwarded from the message receiver 114, and forwards the best value to the message generator 116.

In addition, the agent selector 118 may select, as an upstream agent and a downstream agent, sensor nodes with the best value corresponding to the criteria parameters for the selection of an upstream agent and a downstream agent among the values of the CVB fields of the AREP messages of the respective sensor nodes forwarded from the message receiver 114 during one wake-up interval.

Once the upstream agent is selected, the agent selector 118 forwards information of the upstream agent to the message generator 112. Then, upon receiving an upstream data transmission request, the message generator 112 converts upstream data into an upstream packet and forwards it to the transmitter 112. The upstream packet includes a destination address, i.e., information of the upstream agent. Moreover, the upstream packet includes a final destination address, for example, the address of the server 400.

In addition, once the downstream agent is selected, the agent selector 118 forwards information of the downstream agent to the message generator 112. Then, the message generator 112 piggybacks information of the downstream agent on an upstream packet and transmits the upstream packet to the transmitter 112.

Figure 13:
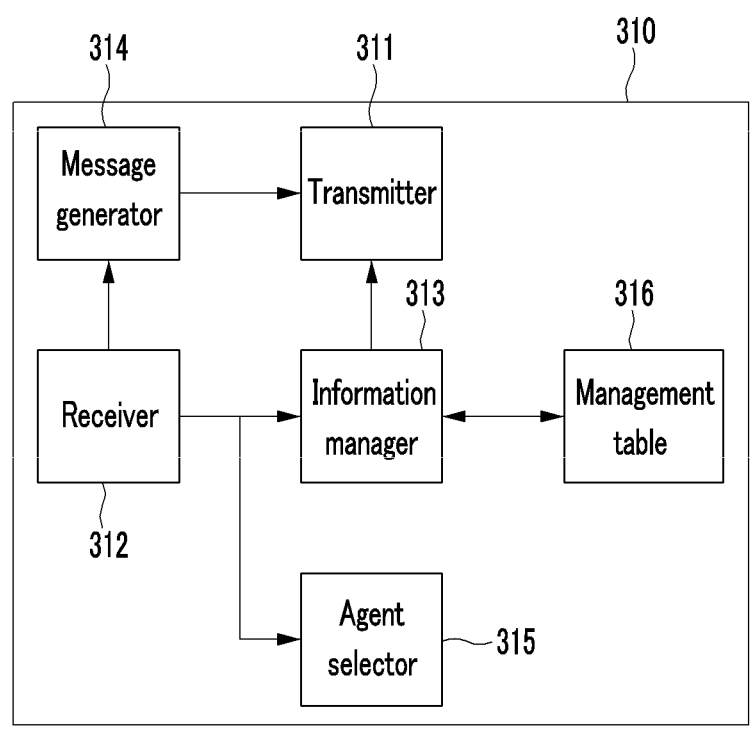
FIG. 13 is a view showing a communication apparatus for a gateway according to an exemplary embodiment of the present invention.

FIG. 13 is a view showing a communication apparatus for a gateway according to an exemplary embodiment of the present invention. Referring to FIG. 13, a communication apparatus 310 of a gateway comprises a transmitter 311, a receiver 312, an information manager 313, a message generator 314, an agent selector 315, and a management table 316.

The transmitter 311 transmits a downstream packet from the server 400 to a sensor node corresponding to a downstream agent, and transmits an upstream packet from the mobile terminal 100 to the server 400.

The receiver 312 receives the upstream packet from the sensor node corresponding to the upstream agent and forwards it to the information manager 313, and receives a downstream packet from the server 400 and forwards it to the information manager 313 and the message generator 314.

Upon receiving an upstream packet, the information manager 313 identifies the packet identifier, the upstream agent, and the destination information from the upstream packet and registers them in the management table 316, and forwards the upstream packet to the transmitter 311. If the upstream packet has information of the downstream agent piggybacked thereon, the information manager 313 may identify the downstream agent and register it in the management table 316.

Upon receiving the information of the downstream agent from the agent selector 315, the information manager 313 registers the downstream agent corresponding to the packet identifier in the management table 316.

When registering the downstream agent in the management table 316, the information manager 313 updates the downstream agents of all packets having the same destination information to be identical to the latest selected downstream agent.

Moreover, upon receiving a downstream packet, the information manager 313 identifies the packet identifier corresponding to the downstream packet, identifies the downstream agent of the downstream packet corresponding to the packet identifier in the management table 316, and forwards information of the identified downstream agent to the message generator 314.

The message generator 314 receives the downstream packet from the receiver 312, and, upon receiving the information of the downstream agent from the information manager 313, forwards the downstream packet using the downstream agent as an intermediate destination address to the transmitter 311.

If there exists a list of sensor nodes delivered as a piggyback on an upstream packet, the agent selector 315 selects one of the sensor nodes in the list using the list of sensor nodes and state information of the sensor nodes in the list.

The management table 132 includes routing information. The routing information may include a packet identifier (PacketID), an upstream data agent (Up_Agent), a downstream data agent (Down_Agent), and destination information (Dest).

According to an exemplary embodiment of the present invention, message load in an agent selection process can be reduced by using a wake-up message used in an asynchronous low power MAC-based wake-up scheme as an agent request message. That is, the transmission and reception of messages is not required for selecting an agent because a wake-up message is used to select an agent, as well as to wake up a sensor node.

Moreover, according to an exemplary embodiment of the present invention, packets can be transmitted and received over an optimal path by selecting an upstream agent and a downstream agent for each packet transmission, and, as a result, the transmission success rate of packets can be improved.

The exemplary embodiments of the present invention described above are not only implemented by the method and apparatus, but it may be implemented by a program for executing the functions corresponding to the configuration of the exemplary embodiment of the present invention or a recording medium having the program recorded thereon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method for a mobile terminal in a sensor network, the method comprising:
   continuously broadcasting an agent request message specifying request information at predetermined time intervals during a first period,
   receiving an agent reply message containing a reply value corresponding to the request information from at least one of a plurality of sensor nodes that has received the agent request message; and
   selecting, as an upstream agent, a sensor node that has transmitted a best value among the reply values of the agent reply messages received during the first period,
      wherein the agent request message includes a first field specifying the request information and a second field specifying a current best value among the reply values of the agent reply messages received during the first period, and
      wherein the broadcasting comprises specifying the best value among the reply values of the agent reply messages in the second field of the agent request message to be broadcast in a second period immediately after the first period, and broadcasting the agent request message;
   selecting the upstream agent to transmit an upstream packet received from the plurality of sensor nodes of the sensor network;
   piggybacking information of the neighboring sensor nodes on the upstream packet and transmitting the upstream packet to the upstream agent; and
   receiving a downstream packet responsive to the upstream packet through a downstream agent selected by a gateway that has received the upstream packet through the upstream agent.

2. The method of claim 1, wherein the at least one sensor node transmits the agent reply message if the value of the second field of the agent request message is worse than its own value, and the at least one sensor node does not transmit the agent reply message and switches to a sleep mode if the value of the second field of the agent request message is better than its own value.

3. The method of claim 1, wherein the first period is one wake-up interval in an asynchronous low power MAC (Medium Access Control)-based wake-up scheme.

4. The method of claim 1, wherein the first period is shorter than one wake-up interval in the asynchronous low power MAC (Medium Access Control)-based wake-up scheme.

5. The method of claim 1, wherein the agent request message is a wake-up message used in the asynchronous low power MAC (Medium Access Control)-based wake-up scheme.

6. The method of claim 3, wherein the agent reply message is a wake-up reply message responsive to the wake-up message.

7. The method of claim 1, wherein the selecting comprises selecting the upstream agent each time the upstream packet is generated.

8. A communication method for a gateway in a sensor network, the method comprising:
   receiving an upstream packet of a mobile terminal through an upstream agent, and the upstream agent is selected via an agent request message, wherein:

the agent request message is continuously broadcast, and specifies request information at predetermined time intervals during a first period, an agent reply message is transmitted containing a reply value corresponding to the request information from at least one of a plurality of sensor nodes that has received the agent request message; and the upstream agent selected is a sensor node that has transmitted a best value among the reply values of the agent reply messages received during the first period, the agent request message includes a first field specifying the request information and a second field specifying a current best value among the reply values of the agent reply messages received during the first period, and the broadcasting comprises specifying the best value among the reply values of the agent reply messages in the second field of the agent request message to be broadcast in a second period immediately after the first period, and broadcasting the agent request message;

registering the upstream agent, a downstream agent, and the address of the mobile terminal corresponding to the sequence number of the upstream packet in a management table;

receiving a downstream packet responsive to the upstream packet from an upper server; and transmitting the downstream packet to the mobile terminal through a downstream agent corresponding to the sequence number of the upstream packet.

9. The method of claim 8, wherein the receiving comprises receiving the information of the downstream agent that is piggybacked on the upstream packet, and the upstream agent and downstream agent is selected by the mobile terminal.

10. The method of claim 9, wherein the receiving comprises receiving a list of neighboring sensor nodes found during the selection of the upstream agent by the mobile terminal that is piggybacked on the upstream packet.

11. The method of claim 10, wherein the registering comprises:
   selecting one of the neighboring sensor nodes as the downstream agent using state information of the neighboring sensor nodes in the list;
   registering the upstream agent and the address of the mobile terminal corresponding to the sequence number of the upstream packet;
   registering the selected downstream agent corresponding to the sequence number of the upstream packet in the management table.

12. The method of claim 8, wherein the registering comprises: updating the registered downstream agents with the same mobile terminal address as the mobile terminal address corresponding to the sequence number of the upstream packet to the latest downstream agent.

13. A communication apparatus for a mobile terminal in a sensor network, the apparatus comprising:
   a transmitter that continuously broadcasts an agent request message specifying request information to a plurality of sensor nodes of the sensor network at predetermined time intervals;
   a receiver that receives an agent reply message responsive to the agent request message from at least one of the sensor nodes that has received the agent request message during respective time periods; and
   an agent selector that selects an upstream agent and a downstream agent based on a reply value corresponding to the request information contained in the agent reply message during a predetermined period, and the upstream agent is selected via the agent request message, wherein:
   the agent request message is continuously broadcast, and specifies the request information at the predetermined time intervals during a first period,
   an agent reply message is transmitted containing the reply value corresponding to the request information from the at least one of the plurality of sensor nodes that has received the agent request message; and
   the upstream agent selected is a sensor node that has transmitted a best value among the reply values of the agent reply messages received during the first period,
   the agent request message includes the first field specifying the request information and a second field specifying a current best value among the reply values of the agent reply messages received during the first period, and
   the broadcasting comprises specifying the best value among the reply values of the agent reply messages in the second field of the agent request message to be broadcast in a second period immediately after the first period, and broadcasting the agent request message.

14. The apparatus of claim 13, further comprising a message generator that piggybacks information of the downstream agent on an upstream packet and transmits the upstream packet to a gateway through the upstream agent.

15. The apparatus of claim 1, wherein the predetermined period is equal or shorter than one wake-up interval in an asynchronous low power MAC-based wake-up scheme.

16. The apparatus of claim 13, wherein the first message is a wake-up message used in the asynchronous low power MAC-based wake-up scheme, and the second message is a reply to the wake-up message.

17. A communication apparatus for a gateway in a sensor network, the apparatus comprising:
   a management table;
   a receiver that receives an upstream packet of a mobile terminal from an upstream agent selected by the mobile terminal, and the upstream agent is selected via an agent request message, wherein:
   the agent request message is continuously broadcast, and specifies request information at the predetermined time intervals during a first period,
   an agent reply message is transmitted containing the reply value corresponding to the request information from at least one of a plurality of sensor nodes that has received the agent request message; and
   the upstream agent selected is a sensor node that has transmitted a best value among the reply values of the agent reply messages received during the first period,
   the agent request message includes the first field specifying the request information and a second field specifying a current best value among the reply values of the agent reply messages received during the first period, and
   the broadcasting comprises specifying the best value among the reply values of the agent reply messages in the second field of the agent request message to be broadcast in a second period immediately after the first period, and broadcasting the agent request message;
   an agent selector that selects a downstream agent using a list of neighboring sensor nodes delivered as a piggyback on the upstream packet of the mobile terminal and state information of the neighboring sensor nodes in the list;

an information manager that registers the upstream agent, the downstream agent, and the address of the mobile terminal corresponding to the sequence number of the upstream packet in the management table; and a transmitter that transmits a downstream packet responsive to the upstream packet to the mobile terminal through the downstream agent.

18. The apparatus of claim 17, wherein the information manager updates the registered downstream agents with the same mobile terminal address as the mobile terminal address corresponding to the sequence number of the upstream packet to the latest downstream agent.

* * * * *